US008452535B2

(12) United States Patent
Zeng et al.

(10) Patent No.: US 8,452,535 B2
(45) Date of Patent: May 28, 2013

(54) SYSTEMS AND METHODS FOR PRECISE SUB-LANE VEHICLE POSITIONING

(75) Inventors: Shuqing Zeng, Sterling Heights, MI (US); Varsha Sadekar, Detroit, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 234 days.

(21) Appl. No.: 12/966,032

(22) Filed: Dec. 13, 2010

(65) Prior Publication Data

US 2012/0150437 A1  Jun. 14, 2012

(51) Int. Cl.
*G01S 19/50* (2010.01)
(52) U.S. Cl.
USPC ............... 701/466; 342/357.33; 701/469
(58) Field of Classification Search
USPC .............. 701/400, 408, 409, 410, 411, 412, 701/416, 422, 428, 439
See application file for complete search history.

(56) References Cited

U.S. PATENT DOCUMENTS

| 5,583,776 | A | * | 12/1996 | Levi et al. ............... 701/400 |
| 5,809,437 | A | * | 9/1998 | Breed ....................... 701/31.9 |
| 6,061,628 | A | * | 5/2000 | Hayashi et al. ........... 701/411 |
| 7,152,022 | B1 | * | 12/2006 | Joshi ............................ 703/2 |
| 7,209,829 | B2 | * | 4/2007 | Litvack et al. ............ 701/533 |
| 7,877,209 | B2 | * | 1/2011 | Harris et al. .............. 701/301 |
| 2005/0060069 | A1 | * | 3/2005 | Breed et al. ................ 701/29 |
| 2007/0168113 | A1 | * | 7/2007 | Litkouhi et al. .......... 701/200 |
| 2008/0162036 | A1 | * | 7/2008 | Breed ........................ 701/207 |
| 2008/0215202 | A1 | * | 9/2008 | Breed ........................ 701/25 |
| 2009/0024321 | A1 | * | 1/2009 | Bando et al. .............. 701/210 |
| 2010/0023197 | A1 | * | 1/2010 | Huang et al. ................ 701/29 |
| 2010/0191391 | A1 | * | 7/2010 | Zeng ............................ 701/1 |
| 2010/0198513 | A1 | * | 8/2010 | Zeng et al. ................. 701/300 |
| 2012/0150437 | A1 | * | 6/2012 | Zeng et al. ................. 701/456 |

* cited by examiner

*Primary Examiner* — Thomas Black
*Assistant Examiner* — Tyler Paige
(74) *Attorney, Agent, or Firm* — Parks IP Law LLC; Mickki D. Murray

(57) ABSTRACT

A vehicle having an on-board computer, vehicle sensors, a satellite-positioning unit, a database storing a lane-level map performs a method to determine a new pose of the vehicle using map matching. The method includes the on-board computer of the vehicle receiving new data from at least one of the vehicle sensors and collecting measurements from the vehicle sensors. The method also includes the on-board computer of the vehicle computing propagation of vehicle pose with respect to consecutive time instances and performing a curve-fitting process. The method further includes the on-board computer of the vehicle performing a sub-routine of updating at least one observation model based on results of the curve-fitting process, performing a tracking sub-routine including using a probability distribution to update the vehicle pose in terms of data particles, and performing a particle filtering sub-routine based on the data particles to compute the new vehicle pose.

20 Claims, 13 Drawing Sheets

SYSTEMS AND METHODS FOR PRECISE SUB-LANE VEHICLE POSITIONING

TECHNICAL FIELD

The present disclosure relates generally to vehicle positioning and, more particularly, to systems and methods for determining a vehicles position at sub-lane accuracy by fusing input from GPS, camera, radar, a lane-level digital map, and vehicle-dynamics sensors.

BACKGROUND

Modern automobiles have on-board computers facilitating vehicle operation and enabling various safety features. Active safety and driver assistance (ASDA) applications require an accurate awareness of vehicle position with respect to a road and other vehicles. Exemplary ASDA applications include navigation applications, lane-keeping and lane centering applications, autonomous driving, and collision-avoidance applications.

For some advanced ASDA operations, accurately positioning the vehicle within a particular lane of a road (lane-level accuracy), not just on-the-road resolution, is needed. Such operations include accurately determining (i) that another vehicle is in the host vehicle path and a separation distance to the other vehicle is decreasing rapidly, (ii) whether the host vehicle is deviating from an intended lateral position (e.g., lane center), and (iii) whether the host vehicle or a nearby vehicle is straying from its present lane, and so possibly changing lanes. Lane-level accuracy generally equates to positioning accuracy within about one meter.

To date, to achieve vehicle positioning of the desired accuracy, correction from a source external to the vehicle has been required. For example, assistance has been provided to the standard global positioning system (GPS) in relative-positioning or differential GPS (DGPS), wide area augmentation system (WAAS) GPS, and combinations of the two.

A primary drawback of such systems is that they inherently rely on the infrastructure additional to the basic GPS. This dependence renders the vehicle less autonomous, and use of the external infrastructure sometimes comes at an added financial cost and/or additional processing cost in terms of time and use of computing resources.

On-board systems have also been used in vehicle positioning. Exemplary systems are inertial-movement units and systems using wheel sensors. These systems, though, cannot be heavily relied upon alone as they inherently accumulate error rather rapidly over time and must themselves be supplemented with accurate positioning updates from the external systems.

SUMMARY

The present disclosure relates to a method performed by a vehicle having an on-board computer, vehicle sensors, a satellite-positioning unit, a database storing a lane-level map for determining a new pose of the vehicle using map matching. The method includes the on-board computer of the vehicle receiving new data from at least one of the vehicle sensors and collecting measurements from the vehicle sensors. The method also includes the on-board computer of the vehicle computing propagation of vehicle pose with respect to consecutive time instances and performing a curve-fitting process. The method further includes the on-board computer of the vehicle performing a sub-routine of updating at least one observation model based on results of the curve-fitting process, performing a tracking sub-routine including using a probability distribution to update the vehicle pose in terms of data particles, and performing a particle filtering sub-routine based on the data particles to compute the new vehicle pose.

The present disclosure also relates to a transportation vehicle configured to determine a new pose of the vehicle using map matching. The vehicle includes multiple vehicle sensors, a satellite-positioning unit, and an on-board computer. The on-board computer includes a processor and a memory storing a lane-level map and instructions for execution by the processor. The instructions, when executed by the processor, cause the processor to receive new data from at least one of the vehicle sensors and collect measurements from the vehicle sensors. The instructions also cause the processor to compute propagation of vehicle pose with respect to consecutive time instances and perform a curve-fitting process. The instructions further cause the processor to perform a sub-routine of updating at least one observation model based on results of the curve-fitting process, perform a tracking sub-routine including using a probability distribution to update the vehicle pose in terms of data particles, and perform a particle filtering sub-routine based on the data particles to compute the new vehicle pose.

In another aspect, the disclosure relates to a tangible, non-transitory computer-readable medium for use in a transportation vehicle and storing instructions executable by a processor. The instructions cause, when executed by the processor, cause the processor to receive new data from at least one of the vehicle sensors and collect measurements from the vehicle sensors. The instructions also cause the processor to compute propagation of vehicle pose with respect to consecutive time instances and perform a curve-fitting process. The instructions further cause the processor to perform a sub-routine of updating at least one observation model based on results of the curve-fitting process, perform a tracking sub-routine including using a probability distribution to update the vehicle pose in terms of data particles, and perform a particle filtering sub-routine based on the data particles to compute the new vehicle pose.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, microprocessor-based electronics, combinations thereof, and the like.

I. General Overview

The present disclosure describes systems and methods for precise sub-lane positioning combining satellite positioning systems (SPS; e.g., global positioning system (GPS)), camera, a lane-level digital map, radar, and other vehicle sensors, such as sensors measuring vehicle dynamics.

In some embodiments, positioning is accomplished by receiving data from multiple inputs, matching vehicle position to the digital map having lane-level accuracy, updating various observation models related to the sources of input, updating weights of particles in a probability distribution, performing an importance re-sampling, and computing a mean of the particles.

In various embodiments, road geometry and map matching is used to localize the vehicle on the road, vision-based lane sensing is used to provide lateral correction for map-matched SPS vehicle position, and traffic in nearby lanes and number-of-lanes information from the map database is used to determine the lane in which the host vehicle is positioned.

II. On-Board Computing Architecture

Figure 1:
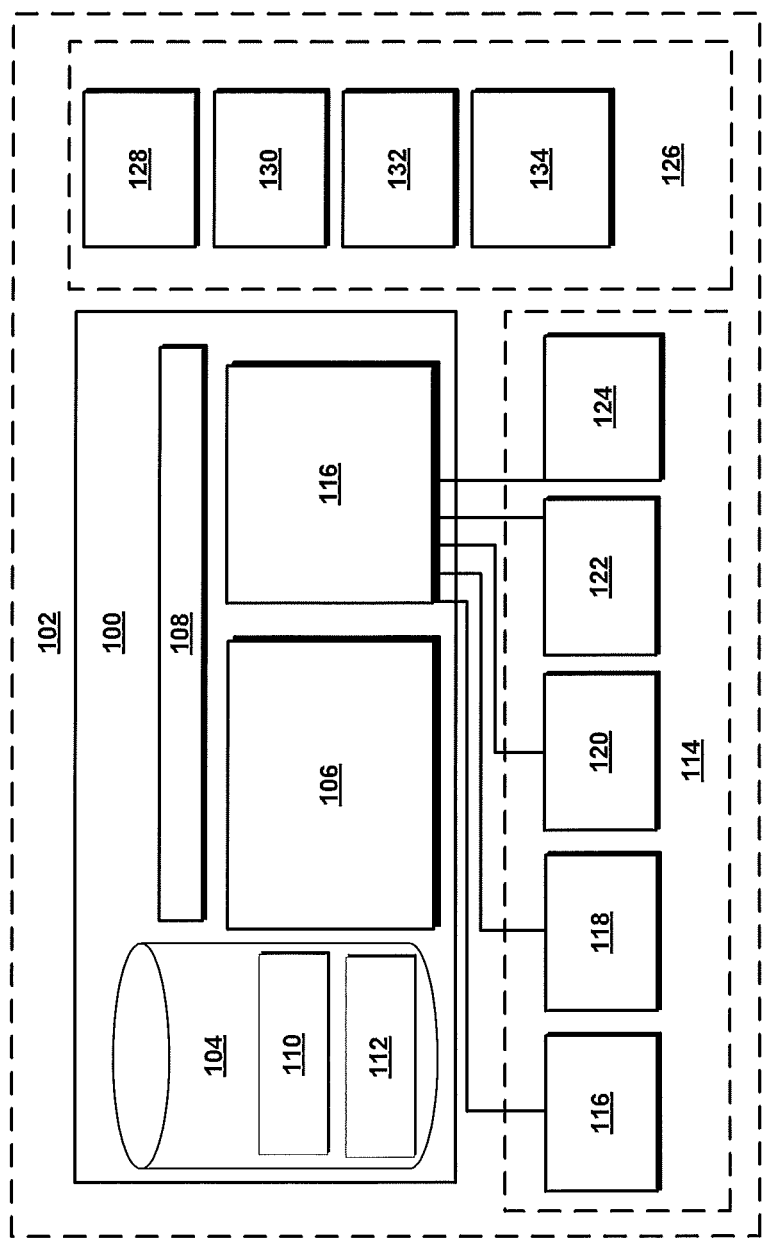
FIG. 1 schematically illustrates an on-board computer architecture, according to an embodiment of the present disclosure.

Turning now to the figures, and more particularly the first figure, FIG. 1 illustrates an on-board computer (OBC) 100 of a subject, or host vehicle 102, according to an embodiment of the present disclosure. The OBC 100 includes a computer-readable storage medium, or memory 104 and a processor 106 in communication with the memory 104 by way of a data bus 108. The memory 104 includes one or more storage modules storing computer-readable instructions executable by the processor 106 to perform the functions of the OBC 100 described herein. For instance, the memory 104 includes mapping or navigation software 110 and other applications 112 for executing the methods of the present disclosure.

The OBC 100 also includes a sensor sub-system 114 comprising sensors providing information to the OBC 100 regarding vehicle operations, vehicle position, vehicle pose, and/or the environment about the vehicle 102. In some embodiments, the sensor sub-system 114 includes at least one camera 116 and at least one range sensor 118, such as a radar. The camera 116 may include a monocular forward-looking camera, such as those used in lane-departure-warning (LDW) systems. Such sensor sensing external conditions may be oriented in any of a variety of directions without departing from the scope of the present disclosure. For example, cameras 116 and radar 118 may be oriented at each, or select, positions of, for example: (i) facing forward from a front center point of the vehicle 102, (ii) facing rearward from a rear center point of the vehicle 102, and (iii) facing laterally of the vehicle from a side position of the vehicle 102. Accordingly, the descriptions below, made primarily with respect to forward-facing sensors, may be applied with respect to rearward and/or side facing sensors, independently or in combination with forward-facing sensors.

The range sensor 118 may include a short-range radar (SRR), an ultrasonic sensor, a long-range RADAR, such as those used in autonomous-cruise-control (ACC) systems, or a Light Detection And Ranging (LiDAR) sensor, for example.

Other sensor sub-systems include an inertial-momentum unit (IMU) 120, such as one having one or more accelerometers, wheel sensors 122, and other available dynamic vehicle sensors 124, such as a sensor associated with a steering system (e.g., steering wheel) of the vehicle 102.

The OBC 100 also includes a sub-system 126 for communicating with external infrastructure. This sub-system 126 includes a SPS unit 128, having a SPS receiver. In some embodiments, the sub-system 126 includes one or more transceivers 130 facilitating long-range wireless communications, such as by way of satellite and cellular telecommunication networks.

The sub-system 126 also includes one or more transceivers 130 facilitating short-range wireless communications. The OBC 100 uses short-range communications at least for vehicle-to-vehicle (V2V) communications and communicating with transportation system infrastructure (V2I). The short-range communication transceiver 130 may be configured to communicate by way of one or more short-range communication protocols, such as Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

III. Method for Precise Positioning

Figure 2A:
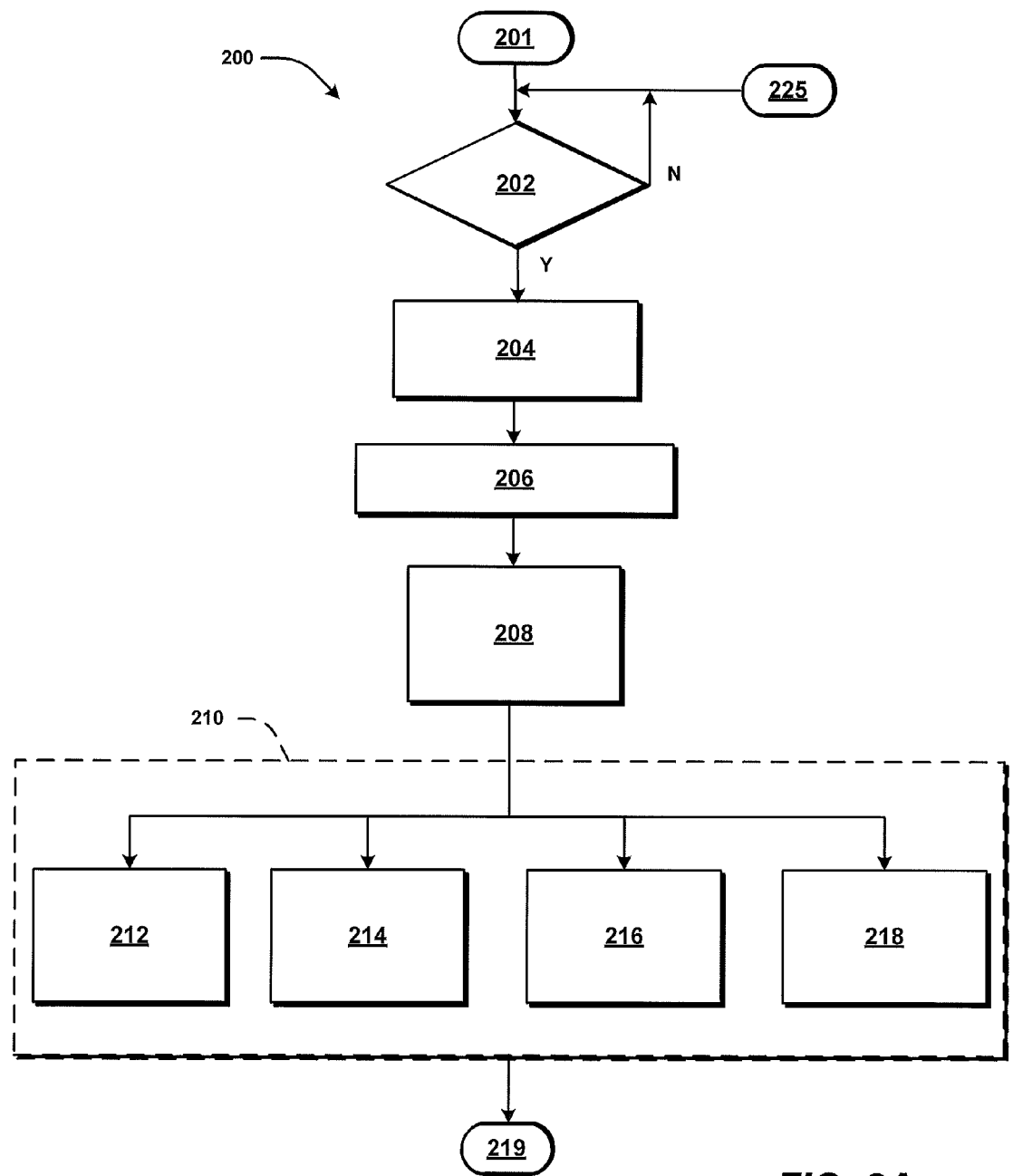
FIGS. 2A and 2B illustrate interrelated portions of a method for sensor-aided vehicle positioning, according to an exemplary embodiment of the present disclosure.
Figure 2B:
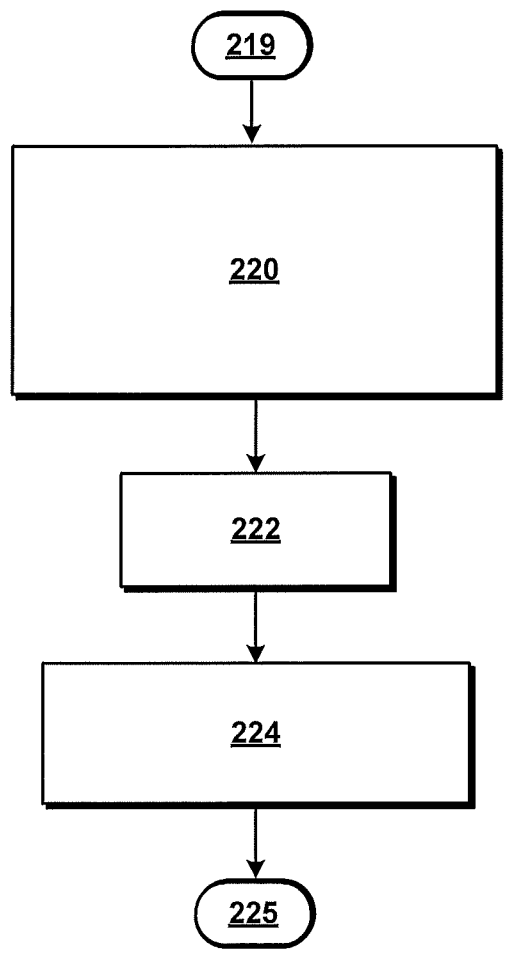

FIGS. 2A and 2B show a method 200 for determining precise position of a vehicle by integrating, or fusing, input from various inputs. More particularly, the method 200 estimates a state of the vehicle from the measurements of SPS, camera, radar, a digital map (e.g., digital map database) having data at lane-level accuracy, and vehicle dynamic sensors and digital-map matching.

In describing the present method 200, reference is made throughout the disclosure to related figures (e.g., FIGS. 3-12) and corresponding descriptions. It should be understood that the steps of the method 200 are not necessarily presented in any particular order and that performance of some or all the steps in an alternative order is possible and is contemplated.

The steps of the method 200 are presented in the demonstrated order for ease of description and illustration. Steps can be added, omitted and/or performed simultaneously without departing from the scope of the appended claims. It should also be understood that the illustrated method 200 can be ended at any time. In certain embodiments, some or all steps of this process, and/or substantially equivalent steps are performed by execution of computer-readable instructions stored or included on a computer-readable medium. For instance, the method may be performed by the processor 106 executing instructions, comprising one or more algorithms, stored in the memory 104 of the OBC 100 of the host vehicle 102.

A. General Premises

A digital map of lane-level accuracy has data identifying edges of lanes of roads, not just edges of the roads. Attributes of such digital maps include a number of lanes and global positions of the lane boundaries and the center lane stripe. In the present disclosure, a state of the host vehicle 102 at a time index t is referred to as s(t). North and east displacements n and e are provided with respect to a base reference point. It is contemplated that a southern displacement can be represented by a negative north displacement value and a western displacement can be represented by a negative east displacement value.

The base reference point can be a virtual point for convenience and any nearby point is a valid candidate. The OBC 100 can reset the base reference point as the vehicle 102 moves. A heading □ is an angle of the vehicle 102 with respect to a north velocity scalar v, and a lane in which the vehicle 102 is positioned is represented by L (e.g., L=1, 2, or 3).

B. Map Matching

The method 200 begins 201 and flow proceeds to step 202, whereat new data is received, such as from one or more of the various sensors 116-124, 128-134. If new data is received, measurements from the sensors 116-124, 128-134 is collected at step 204.

Upon collecting the new sensor data in step 204, at step 206, propagation of vehicle pose is computed with respect to vehicle poses at consecutive time instances. Vehicle pose refers to an orientation of the vehicle and can be represented in a variety of ways, such as by an angle separating a forward-facing vehicle center line from true North. In some embodiments, pose of the vehicle 102 is evaluated based on a vehicle dynamic model, such as by considering a constant velocity (CV) or a constant turning (CT). The step 206 of computing propagation of vehicle pose is described below in further detail in connection with FIG. 9.

At step 208, (i) the current road segment, represented by waypoints identifying aspects of the road (e.g., edges, center line), for example, is matched based on the current vehicle position, (ii) a curvature profile of a cubic curve fitted from the waypoints is computed, and (iii) a closest point on the curve from the vehicle position is identified. This process can be referred to as curve fitting.

The waypoints can be represented by $p_i=(x_i,y_i)$, and the host vehicle's current position denoted as $p_H=(x_H,y_H)$, for example. A standard cubic curve fitting procedure will find a curve profile, e.g., $c(s)=(x(s), y(s))$, represented by the parameter s (i.e., the arc length). The curvature profile can be computed as:

$$C(s) = \frac{|x'y'' - y'x''|}{(x'^2 + y'^2)^{\frac{3}{2}}},$$

where the primes refer to derivatives with respect to the parameter s.

The closest point on the curve s* is defined as:

$$s^* = \mathrm{argmin}_E \|c(s) - p_H\|,$$

with argmin being the argument of the minimum.

The curvature of the closest point on the curve is $C(s^*)$. With t(s) corresponding to an equation of the tangent line of the curve at point p(s), the closest point s* can be iteratively computed as:

1. Let s*=0;
2. Compute the tangent equation at s* and find the closest point p* on the tangent to $p_H$;
3. $s^* = s^*(p_H - p^*)'n$, where n is the normalized tangent vector, i.e., $\|n\|=1$; and
4. Go to step 2, then 3, for a number (e.g., five) of iterations, and then stop.

C. Update Models

The method 200 further includes a sub-routine 210 in which various observations models are updated. Particularly, the sub-routine 210 includes a step 212 of updating a vision observation model, a step 214 of updating a radar observation model, a step 216 of updating an SPS (e.g., GPS) observation model, and a step 218 of updating an observation model for map attribute-based matching. For updating the observation model of map attribute-based matching, the matching may related to, for example, a curvature or an overhead object or structure (e.g., bridge or tunnel), as described in further detail, below.

1. Update Vision Observation Model

Figure 3:
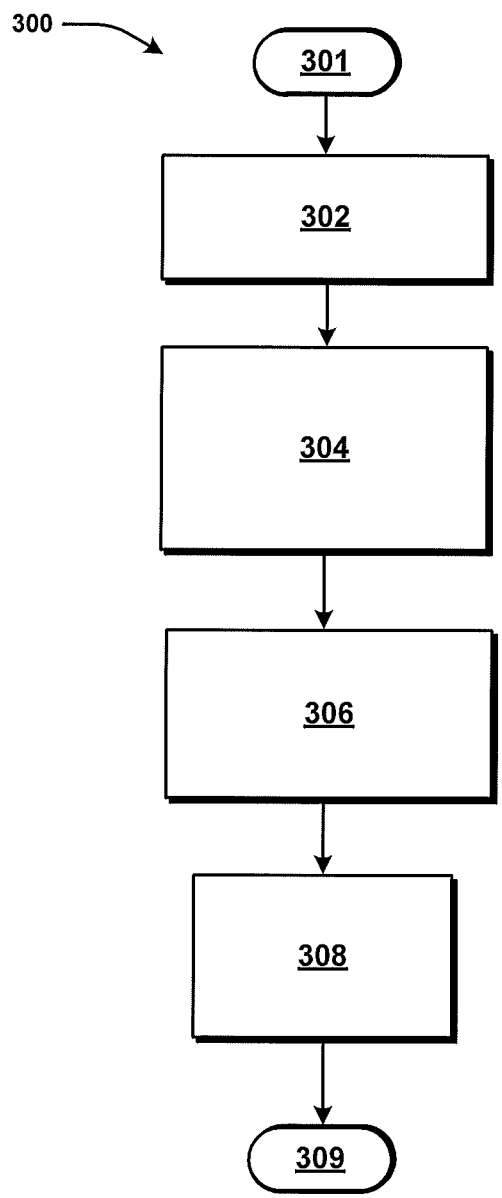
FIG. 3 illustrates a method for updating a vision observation model, according to an embodiment of the present disclosure.

FIG. 3 shows a process 300 for updating the vision observation model in step 212, according to an embodiment of the present disclosure.

It should be understood that the steps of the method 300 are not necessarily presented in any particular order and that performance of some or all the steps in an alternative order is possible and is contemplated.

The steps of the method 300 are presented in the demonstrated order for ease of description and illustration. Steps can be added, omitted and/or performed simultaneously without departing from the scope of the appended claims. It should also be understood that the illustrated method 300 can be ended at any time. In certain embodiments, some or all steps of this process, and/or substantially equivalent steps are performed by execution of computer-readable instructions stored or included on a computer-readable medium. For instance, the method may be performed by the processor 106 executing instructions, comprising one or more algorithms, stored in the memory 104 of the OBC 100 of the host vehicle 102.

As shown in FIG. 3, the process 300 for updating the vision observation model begins 301 and includes a step 302 of retrieving data from the digital map identifying one or more registered lane lines (e.g., lane stripes) nearby the vehicle. This retrieval is performed using the position of the vehicle 102 and the pose propagation of the vehicle 102 from step 206 of FIG. 2A. In some embodiments, lane stripes within a predetermined threshold distance of the position of the vehicle 102 are identified, and only these identified stripes are further analyzed.

After identifying the registered lane stripes, the process 300 proceeds to a step 304 of computing a position of the lane stripe(s) with respect to a reference frame of the host vehicle 102. Given the position and the pose of the vehicle 102, the lane stripes registered in the global coordinate system of the digital map are projected onto the vehicle frame.

In some embodiments, at step 306, the detected and registered lane stripes and boundaries are matched using a Euclidean-type analysis of distance. Therein, only objects within a predefined threshold distance of the host vehicle 102 are matched. With the matched data, at step 308, an observation probability distribution with respect to the camera data is computed. Particularly, at step 308, a vision observation model $p(o_{vis}|s_i)$ is computed as follows. The vision observation model $p(o_{vis}|s_i)$ is updated based on measurements of the vision system (including, e.g., the camera 116). This update process is further described, here, in connection with FIG. 4. Further illustration of the present technique is provided further below with reference to FIG. 11. Two kinds of vision measurements are employed to correct position of the host vehicle 102: (i) lateral measurement and (ii) position and orientation of lane stripes.

Figure 4:
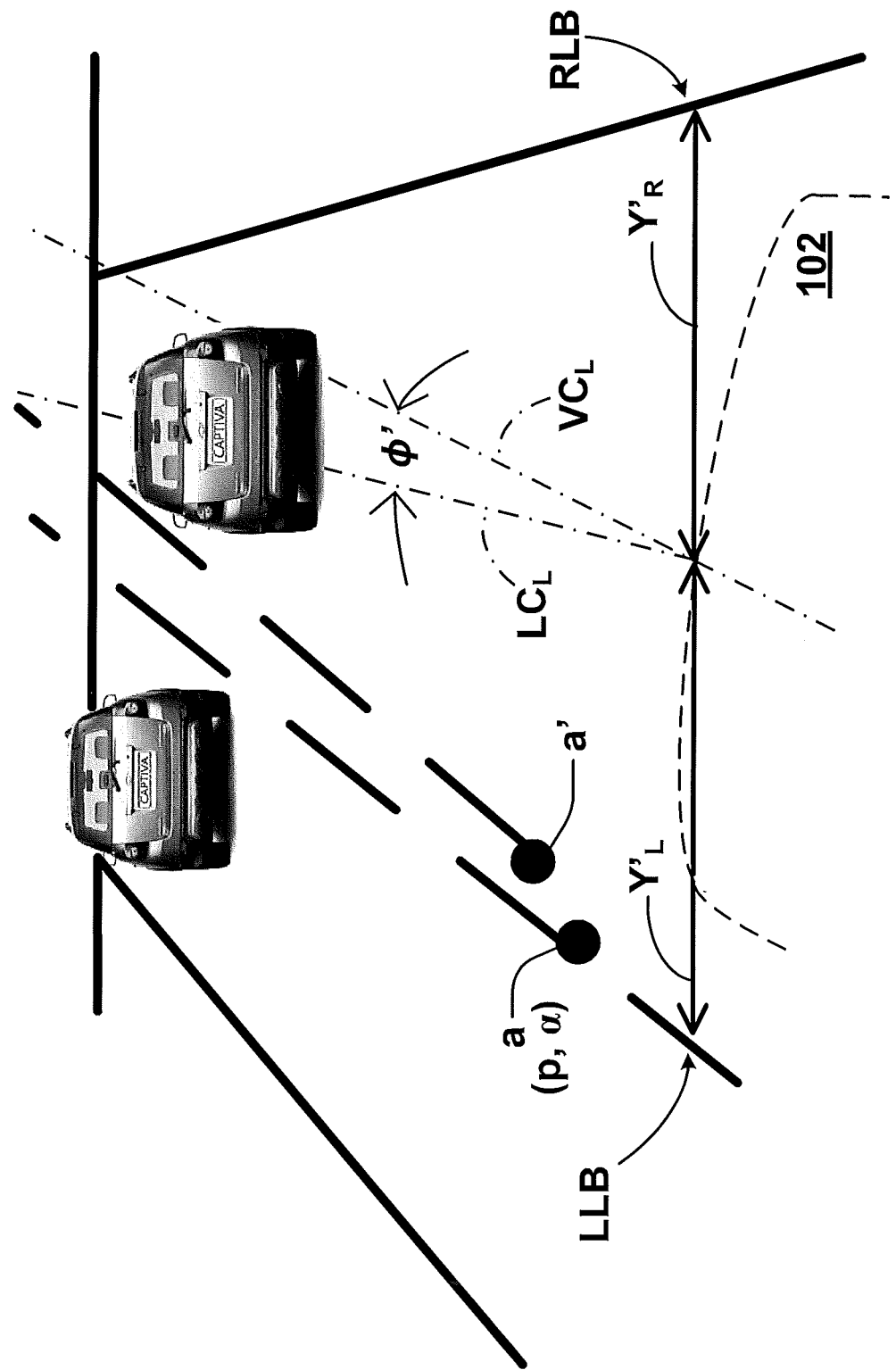
FIG. 4 illustrates an on-road scenario for describing vision measurements, according to an embodiment of the present disclosure.

FIG. 4 shows a lane centerline $LC_L$, a vehicle centerline $VC_L$, lateral distances $Y_R'$, $Y_L'$ from the vehicle centerline $VC_L$ to right and left lane boundaries RLB, LLB, and an angular offset $\phi$ between the lane centerline $LC_L$ and the vehicle centerline $VC_L$.

FIG. 4 also shows a start point of a detected lane stripe a' and a start point of a corresponding lane stripe a provided in the digital map. Each registered stripe a has a position and an orientation, $(p,\alpha)$, consisting of a SPS position p (e.g., latitude, longitude) and an orientation $\alpha$, such as with respect to true North. The SPS position p and orientation $\alpha$ of the vehicle 102 is adjusted, or corrected such that the detected and registered lane stripes overlap each other. This can be accomplished, for example, by determining a difference in position and a difference in orientation between the detected lane stripe a' and the registered stripe a.

Vision system measurements include: left and right lateral measurements L' and R', and measurements F of the detected lane strip a'. The left lateral measurement $L'=(y_L',\phi_L')$, represents an offset and an orientation, respectively, of the vehicle 102 to a left lane boundary LLB. The right lateral measurement $R'=(y_R',\phi_R')$, represents an offset and an orientation, respectively, to a right lane boundary RLB.

Measurements F' of the detected lane stripe a' can be represented as: $F'=(x_p', y_p', \alpha')$, including a longitudinal offset $x_p'$ between the vehicle 102 and the detected starting point of the stripe a', a lateral offset $y_p'$ between the vehicle 102 and the detected starting point of the stripe $\alpha'$, and an orientation a' of the stripe, respectively.

The detected lane stripe and the lane boundaries are registered in the digital map (e.g., in a map database). Given a particle $s_i$, the lane boundaries are matched to the stripe using the position of the vehicle 102, the pose of the vehicle 102, and the present lane index L for the vehicle 102. Then, the matched boundaries and stripe are projected to the vehicle frame as L, R, and F, respectively.

Thus, the vision observation model $p(o_{vis}|s_i)$ can be computed as:

$$p(o_{vis}|s_i) = c\exp\left(-\frac{\|L-L'\|^2}{2\sigma_L^2}\right)\exp\left(-\frac{\|R-R'\|^2}{2\sigma_R^2}\right)\exp\left(-\frac{\|F-F'\|^2}{2\sigma_F^2}\right) \quad (1)$$

where c is a normalization constant for a density function, and $\sigma_L$, $\sigma_R$, and $\sigma_F$ corresponds to an accuracy specification of the lane sensing data. The process 300 may end 309.

2. Update Radar Observation Model

Figure 5:
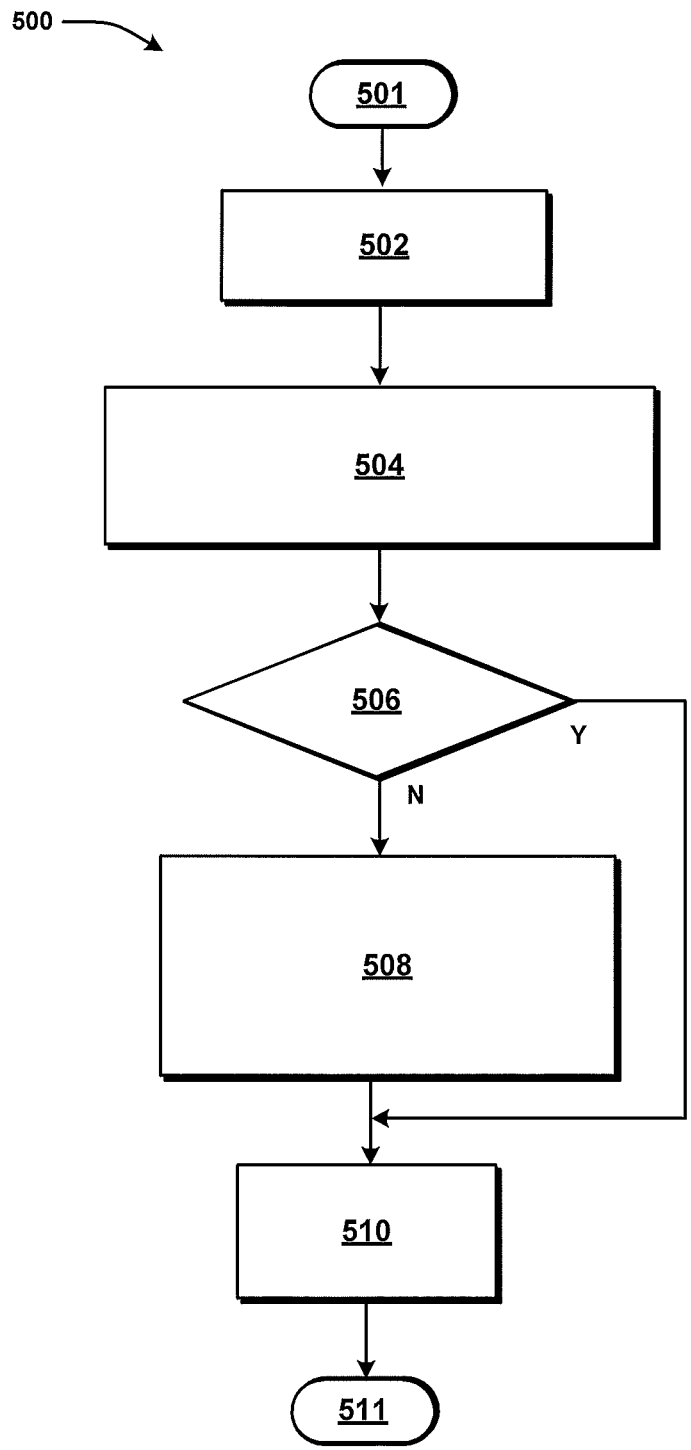
FIG. 5 illustrates a method for updating a radar observation model, according to an embodiment of the present disclosure.
Figure 6:
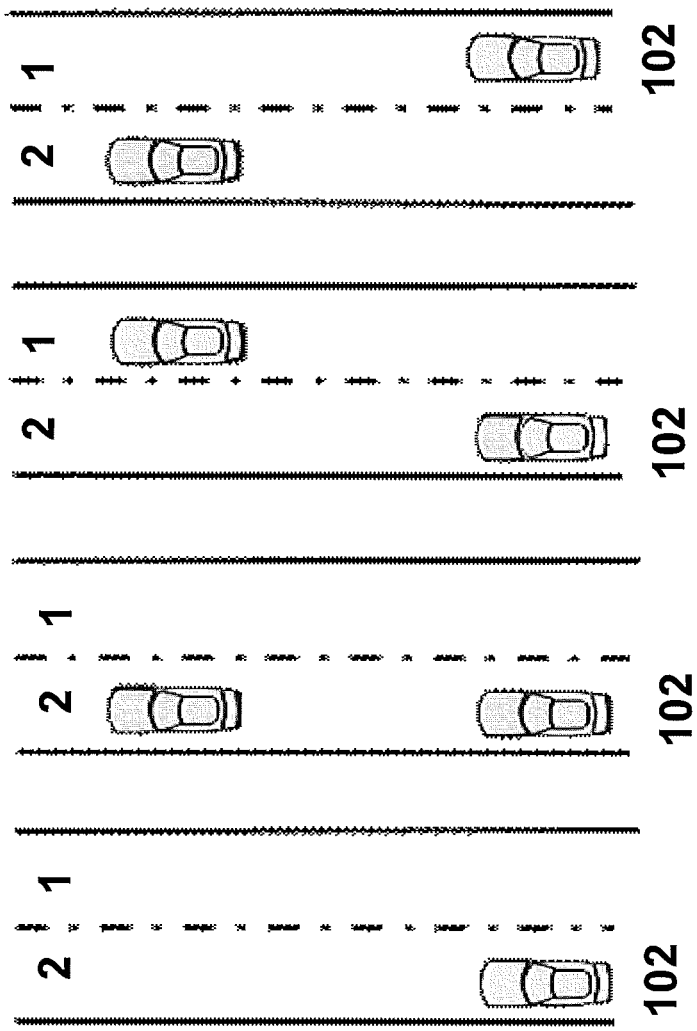
FIGS. 6A, 6B, 6C, and 6D illustrate various on-road scenarios for describing determination of lateral position using the radar system, according to an embodiment of the present disclosure.

FIG. 5 shows a process 500 for updating the radar observation model of step 214, according to an embodiment of the present disclosure.

It should be understood that the steps of the method 500 are not necessarily presented in any particular order and that performance of some or all the steps in an alternative order is possible and is contemplated.

The steps of the method 500 are presented in the demonstrated order for ease of description and illustration. Steps can be added, omitted and/or performed simultaneously without departing from the scope of the appended claims. It should also be understood that the illustrated method 500 can be ended at any time. In certain embodiments, some or all steps of this process, and/or substantially equivalent steps are performed by execution of computer-readable instructions stored or included on a computer-readable medium. For instance, the method may be performed by the processor 106 executing instructions, comprising one or more algorithms, stored in the memory 104 of the OBC 100 of the host vehicle 102.

As shown in FIG. 5, the process for updating the radar observation model begins 501 and includes a step 502 of reading radar data. The process 500 continues with a step 504 of deleting static radar objects from the data objects being evaluated. In one embodiment, static objects are identified as those having a ground speed that is less than a predetermined threshold, such as objects appearing to be not moving.

Figure 11:
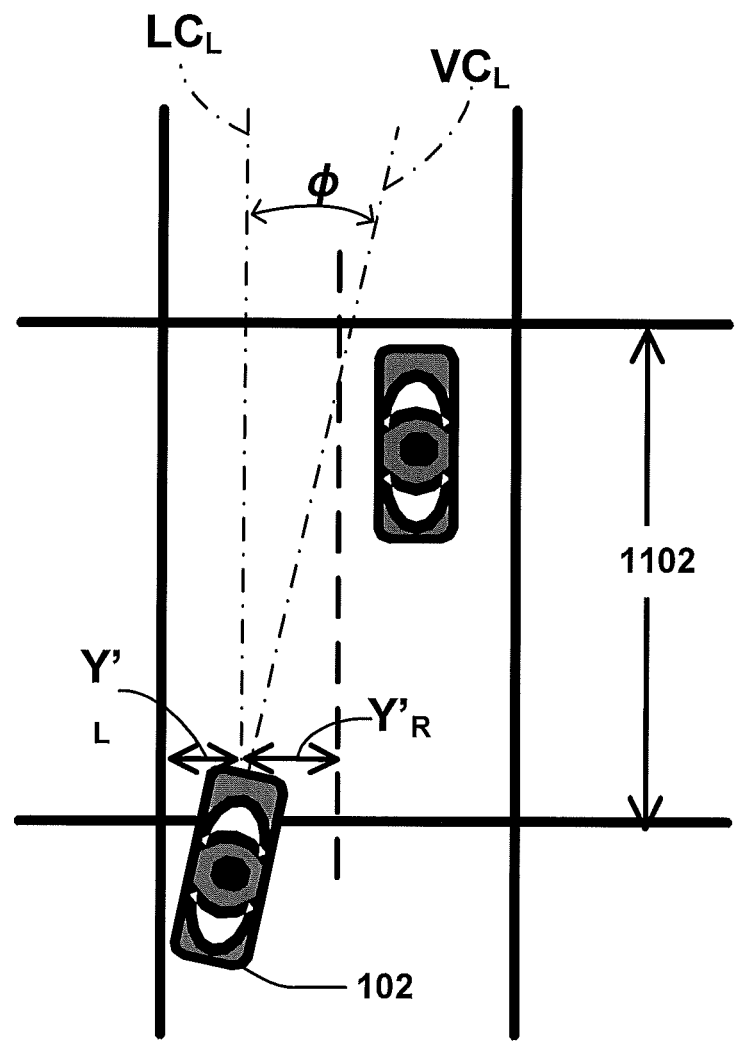
FIG. 11 illustrates an on-road scenario including an overhead structure for describing vehicle position correction based on the overhead structure, according to an embodiment of the present disclosure.

At step 506, it is determined whether there is a present lane-change maneuver (i.e., a lane change has occurred or is apparently occurring) for the host vehicle 102. The vehicle 102 can determine whether a lane change is occurring or apparently imminent in any of a variety of ways, such as by evaluating an angular offset of a vehicle centerline from a lane centerline (or other points or lines, such as a lane edge). FIGS. 4 and 11 show angular offsets between a vehicle centerline and a lane centerline in exemplary on-road scenarios.

Another way of determining whether a lane change is occurring or apparently imminent, performed independent or along with other ways (e.g., angular offset evaluation), is to evaluate a lateral offset between the vehicle and one or more lane boundaries and/or the lane centerline. FIGS. 4 and 11 also show examples of lateral offsets between the vehicle centerline and lane edges.

If a lane-change maneuver is not occurring and apparently not imminent in step 506, flow proceeds to step 508, where a lane is assigned to each moving radar object based on a lateral offset from the centerline of the lane of the host vehicle 102. This negative determination in step 506 leading to step 508, can be arrived at by the vehicle 102 not determining that the vehicle 102 has changed/is changing from one lane to another lane, or by the vehicle 102 actively determining that the vehicle 102 is apparently not changing lanes.

If it is determined at step 506 that a lane-change maneuver is apparently present, the step 508 of assigning a lane to the moving radar objects is not performed.

At step 510, an observation probability distribution, or vision observation model $p(l|s_i)$ is computed with respect to the radar data. In some embodiments, l in this model is a quantifiable value indicating a likelihood that the vehicle 102 is in a lane. For instance, l may be represented as 0.5 or 50% if it is unknown which lane the vehicle is in and that, based on available data, there is an about 50% chance that the vehicle 102 is in a right lane of two adjacent lanes and a 50% chance that the vehicle is in a left lane of the two lanes. As another example, the value l could be 0.9, or 0.1 (depending on perspective of the algorithm), to indicate that there is a 90% chance that the vehicle 102 is in the right lane. The process 500 may end 511.

Data from the radar system (e.g., range sensor 118) identifying nearby traffic can indicate or provide helpful data indicating a lane index L for the host vehicle 102. The radar system, alone, only partially observes the state variable lane index L. Reference is made, here, to FIGS. 6A-D. As shown in FIGS. 6A and 6B, there is no discernable object information from which to conclude, based only on the radar, that there is a lane to the left or to the right of the host vehicle 102, and so from which to infer which lane the host vehicle 102 is positioned in.

Thus, for the scenarios of FIGS. 6A and B, $p(l|s_i)$ is uniformly distributed in a set $\{1,2\}$; e.g., $p(l=1|s_i)=0.5$ and $p(l=2|s_i)=0.5$.

In the scenario of FIG. 6C, traffic flow in a lane to the right of a lane of the host vehicle 102 on a two-lane road at least partially indicates that the host vehicle 102 is in a left lane. Similarly, in the case of FIG. 6D, traffic flow in a lane to the left of a lane of the host vehicle 102 on the two-lane road at least partially indicates that the host vehicle 102 is in the right lane. Therefore, the observation model for the two-lane road for the scenario of FIGS. 6C and D can be written as:

$$p(l=1|s_i=1)=0.9, p(l=2|s_i=1)=0.1, p(l=1|s_i=2)=0.1, \text{ and}$$

$$p(l=2|s_i=2)=0.9 \quad (2)$$

Similar analysis can apply to roads having more than two lanes (e.g., a three-lane, four-lane, five-lane road, etc.).

3. Update SPS Observation Model

Because the SPS directly observes state variables (except the lane index L), the SPS observation model computation can be represented rather $$p(o_{gps}|s_i) = c \exp\left(-\frac{\|s_i - o_{gps}\|^2}{2\sigma_{gps}^2}\right) \quad (3)$$

where c is a normalization constant, $v_{gps}$ corresponds to an accuracy specification of the SPS receiver, and $\sigma_{gps}$ is a SPS measurements of state variables e, n, $\theta$, and v.

4. Update Observation Model for Map Matching

Figure 7:
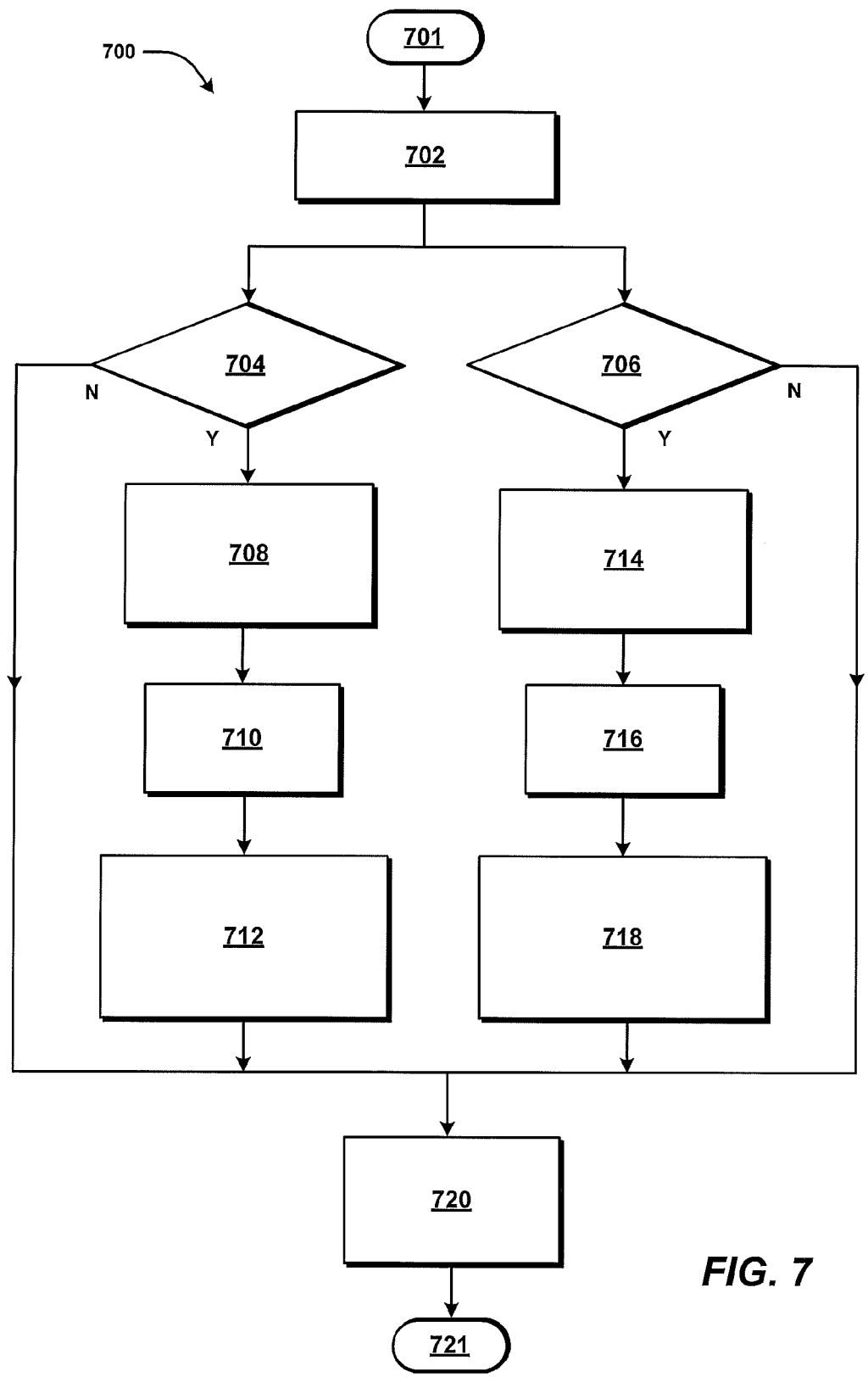
FIG. 7 illustrates a method for updating an observation model for matching map attributes, according to an embodiment of the present disclosure.

FIG. 7 shows a process 700 for updating an observation model for map attribute-based matching at step 218, according to an embodiment of the present disclosure.

It should be understood that the steps of the method 700 are not necessarily presented in any particular order and that performance of some or all the steps in an alternative order is possible and is contemplated.

The steps of the method 700 are presented in the demonstrated order for ease of description and illustration. Steps can be added, omitted and/or performed simultaneously without departing from the scope of the appended claims. It should also be understood that the illustrated method 700 can be ended at any time. In certain embodiments, some or all steps of this process, and/or substantially equivalent steps are performed by execution of computer-readable instructions stored or included on a computer-readable medium. For instance, the method may be performed by the processor 106 executing instructions, comprising one or more algorithms, stored in the memory 104 of the OBC 100 of the host vehicle 102.

As shown in FIG. 7, the process 700 for updating an observation model for map attribute-based matching begins 701 and includes a step 702 of collecting yaw rate and speed from vehicle dynamic sensors. As provided above, vehicle dynamic sensors can include, for example, the IMU 120 and the wheel sensors 122. In addition, or in any combination with the IMU 120 and the wheel sensors 122, the dynamic sensors utilized in this step 702 may include other available dynamic vehicle sensors 124, such as steering wheel sensor.

Following determination of yaw rate and speed in step 702, two determinations are performed, substantially simultaneously or in any order. At step 704, it is considered whether an overhead structure or object, such as a bridge or tunnel, is present. At step 706, it is considered whether a lane-change maneuver is apparently present. Though overhead structures are described primarily herein, underlying structures (e.g., a road passing underneath a road of the host vehicle 102) may be considered in similarly fashion.

If at step 704, an overhead object is detected, flow proceeds to step 708, whereat a position of the overhead object is computed. The position of the overhead object is determined based on digital map data identifying the object.

At step 710, detection of the overhead object is performed, such as using SPS data (e.g., data from the SPS unit 128). For instance, many SPS receivers generate information about visible satellites (i.e., satellites in a line-of-sight from the host vehicle's view), such as number and identification of such satellites, and where and when signals from them are expected. If a satellite in line-of-sight configuration is not observed by the receiver, though, then a determination that an overhead object is present can be made.

Following the SPS-based detection of the overhead object in step 710, an observation probability distribution is computed with respect to the overhead object. The computing of step 712 is performed using the object position determined in step 708 and results of the SPS detection of step 710.

If it is determined at step 704 that an overhead object is not present, the steps 708-712 of evaluating the overhead object and computing the observation probability distribution are not performed.

If it is determined at step 706 that a lane-changing maneuver is present, flow proceeds to step 714, whereat a lane curvature is computed. The lane curvature is computed as a function of an arc length of the curve. The arc length can be discerned, for example, using SPS data regarding waypoints on the curve.

Figure 8:
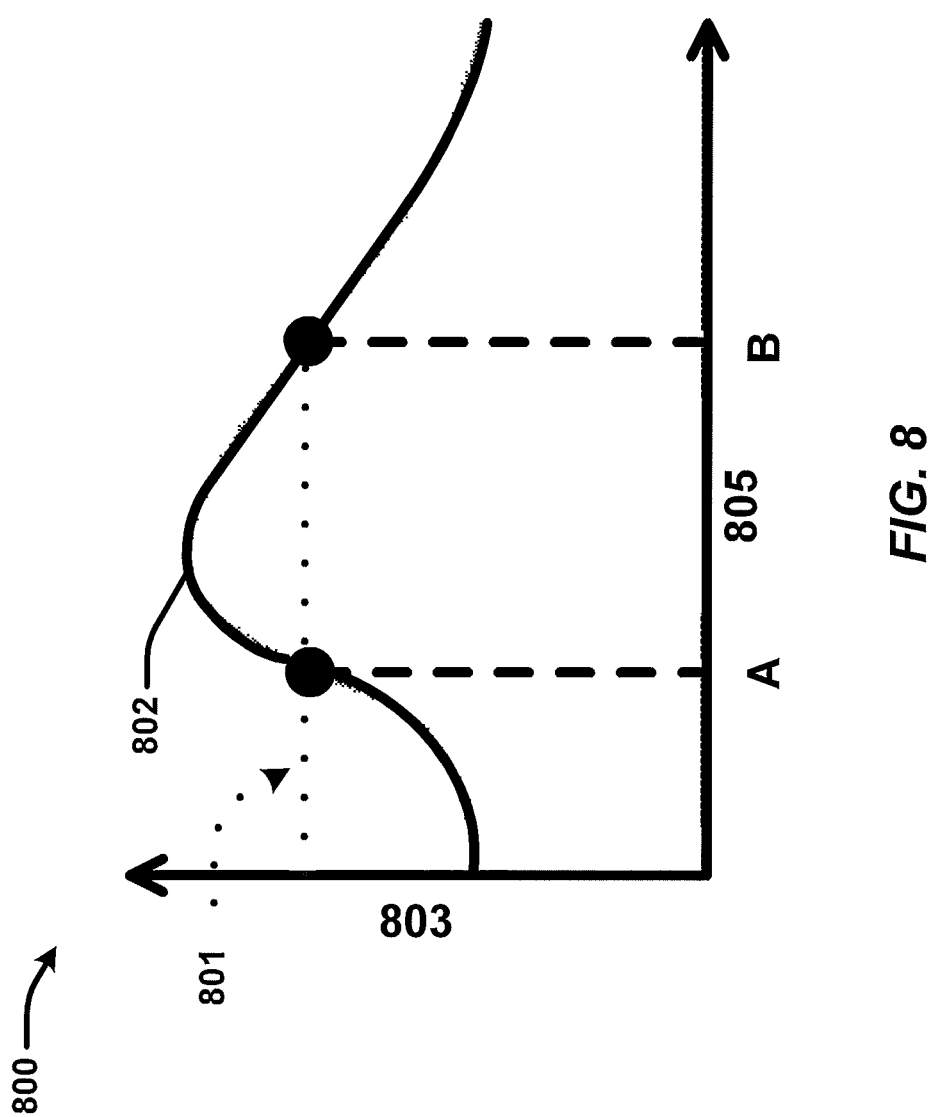
FIG. 8 illustrates a graph associated with longitudinal correction based on curvature matching, according to an embodiment of the present disclosure.

At step 716, a vehicle path curvature is computed using, at least in part, the lane curvature determined in step 714. FIG. 8 shows an exemplary vehicle path curvature 801 on a graph of curvature 803 of the present road segment versus longitudinal offset 805 of the vehicle 102. It will be appreciated that the longitudinal offset of the vehicle 102 will be generally 0 when the vehicle 102 is at a start of the road curve—the vehicle is traveling straight before encountering the curve.

At step 718, an observation probability distribution for curvature match is computed. This computation is described in further detail in the following paragraphs. The observation probability distribution for curvature match of step 718 is computed based, at least in part, on the vehicle path curvature determined in step 716.

If it is determined at step 706 that a lane-changing maneuver is not apparently present, the steps 714-718 of evaluating lane curvature and computing the observation probability distribution for curvature match are not performed.

At step 720, a combined probably distribution with respect to the map $p(o_{map}|s_i)$ is computed based on the distributions resulting from steps 712 and/or 718, as the case may be. For example, if it is not determined that an overhead object is overhead or very near in step 704, and it is determined that a lane-change maneuver is apparently present in step 706, the probability distribution computation of step 720 will be based on only the distribution computed in step 718.

If, on the other hand, it is determined at step 704 that that an overhead object is present and at step 706 that the host vehicle has not changed lanes/is not changing lanes, the probability distribution computation of step 720 will be based on only the distribution computed in step 712.

If, though, it is determined that an overhead object and a lane-change maneuver are apparently present, the probability distribution computation in step 720 will be based on both of the distribution results of steps 712 and 718.

Computing the combined probably distribution with respect to the map, or observation model for map-attribute-based matching is described in further detail, here. A map attribute-based matching includes a mechanism for relatively low-cost correction of SPS longitudinal positioning using SPS blockage detection and data from vehicle-dynamics sensors (e.g., the IMU 120, the wheel sensors 122, and/or other available vehicle-dynamics sensors 124).

In some embodiments, when there is no lane-change maneuver, it is assumed that an instantaneous path curvature (yaw rate divided by vehicle speed) of the vehicle 102 is a measurement of lane curvature at the current host vehicle position. By matching the instantaneous vehicle path curvature with the curvature profile from digital map, the vehicle longitudinal offset of the vehicle 102 in the digital map can be inferred. FIG. 8 shows a graph 800 illustrating this concept. Particularly, the graph 800 of FIG. 8 shows a longitudinal correction based on curvature matching. The method 700 of FIG. 7 may end 721.

The graph 800 of FIG. 8 includes a curvature profile 802 of a present road segment. The host vehicle 102 may be located in any position along the segment. However, if the instantaneous curvature is known, the possible vehicle locations will be narrowed down to two points A and B, shown in FIG. 8.

Figure 12:
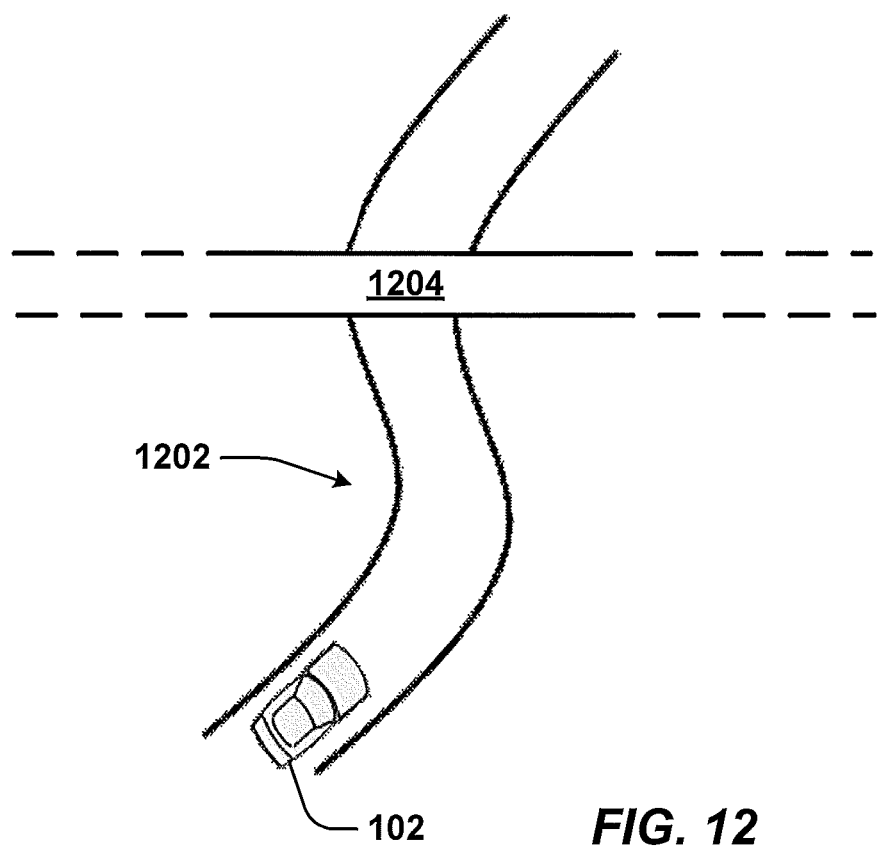
FIG. 12 illustrates an on-road scenario including a curve in the road and an overhead structure for describing vehicle position correction based on the curve and the overhead structure, according to an embodiment of the present disclosure.

Also, overhead objects can be detected by a SPS blockage algorithm. If a global position of the object is known from the digital map, then the structure can be used to correct SPS measurement (e.g., longitudinal). When the vehicle 102 moves under the object, SPS signals are most often blocked from reaching the vehicle 102, and thereby the vehicle 102 determines that the vehicle 102 is under, or very close to, the object. A schematic illustration of this scenario is illustrated in FIG. 12, which also illustrates a curve that the vehicle 102 could sense and compare the sensed position to SPS data for the curve to improve positioning of the vehicle 102.

An observation model for map-attribute-based matching can be referred to as $p(o_{map}|s_i)$, and computed as:

$$p(o_{map}|s_i) = \begin{cases} 1 & \text{if } LC \text{ and no } GPS \text{ blockage} \\ c_B \exp\left(-\frac{\|s_i - o_B\|^2}{2\sigma_B^2}\right) & \text{if } GPS \text{ blockage and } LC \\ c_\kappa \exp\left(-\frac{\|\kappa(s_i) - \kappa_H\|^2}{2\sigma_\kappa^2}\right) & \text{if } GPS \text{ blockage and no } LC \\ c_B c_\kappa \exp\left(-\frac{\|s_i - o_B\|^2}{2\sigma_B^2}\right)\exp\left(-\frac{\|\kappa(s_i) - \kappa_H\|^2}{2\sigma_\kappa^2}\right) & \text{Otherwise.} \end{cases} \quad (4)$$

where $o_B$ is a global location of the bridge in the digital map, $\kappa_H$ is a curvature of vehicle path, $\kappa(s_i)$ is a road curvature, $\sigma_B$ and $\sigma_\kappa$ are heuristic values indicating accuracy of the correction, and $c_B$ and $c_\kappa$ are normalization constants for probability density function.

D. Update Weight of Particles

Continuing with the method 200 for determining precise position of the vehicle to FIG. 2B, the method 200 proceeds to implement a tracking algorithm or sub-routine at step 220, where a weight $w_i$ of particles $s_i$ (i=1, ..., N) representing a probability distribution of the host vehicle pose is updated. The weight $w_1$ of a particle $s_i$ denotes a probability that the particle $s_i$ would be selected in a re-sampling process, such as an importance re-sampling described below in connection with the next step 222 of the method 200.

The weight $w_i$ of the particles $s_{1...N}$ is updated based on a fusion of the various observation models updated in the steps 212-218 of the sub-routine 210.

A probability distribution of a state vector S(t) is modeled as follows:

$$S(t) = \{s_i(t), i=1, \ldots, N\}$$

For each particle $s_i$, the weight $w_i$ is computed as follows:

$$w_i = p(x|s_i) \qquad (5)$$
$$= p(o_{vis}|s_i)p(l|s_i)p(o_{gps}|s_i)p(o_{map}|s_i)$$

where $p(o_{vis}|s_i)$, $p(l|s_i)$, $p(o_{gps}|s_i)$, and $p(o_{map}|s_i)$ denote the observation models for vision system, radar, SPS, and map-attribute-based matching, respectively, as described above. x symbolizes the combination of each corresponding observation model measurement: $o_{vis}$, l, $o_{SPS}$, and $o_{map}$.

E. Importance Re-Sampling and Computing Vehicle Pose

At step 222, an importance re-sampling is performed. Importance re-sampling, or importance sampling, is a statistical technique for estimating properties of a distribution using only samples of data points (or particles) generated from a different distribution.

In the re-sampling, input includes a list of particles $(s_i, w_i)$, and samples are randomly drawn N times, using the weight $w_1$ as the probability to be chosen. Thus the output of the procedure is a list of new particles $\{s_i', i=1, \ldots, N\}$ with an $$w_i' = \frac{1}{N}$$

At step 224, a correct vehicle pose is computed as a mean of applicable particles. The vehicle position can be represented as follows:

$$\bar{s} = \frac{\sum_{i=1}^{N} s_i'}{N}$$

The process of steps 222 and 224 may be referred to as particle filtering by which less-relevant particles, such as more extreme particles of a Gaussian distribution of particles, are less considered, or not at all, considered. The correct vehicle position computed as such represents a final estimate of vehicle pose at time index t.

IV. System Dynamics

Figure 9:
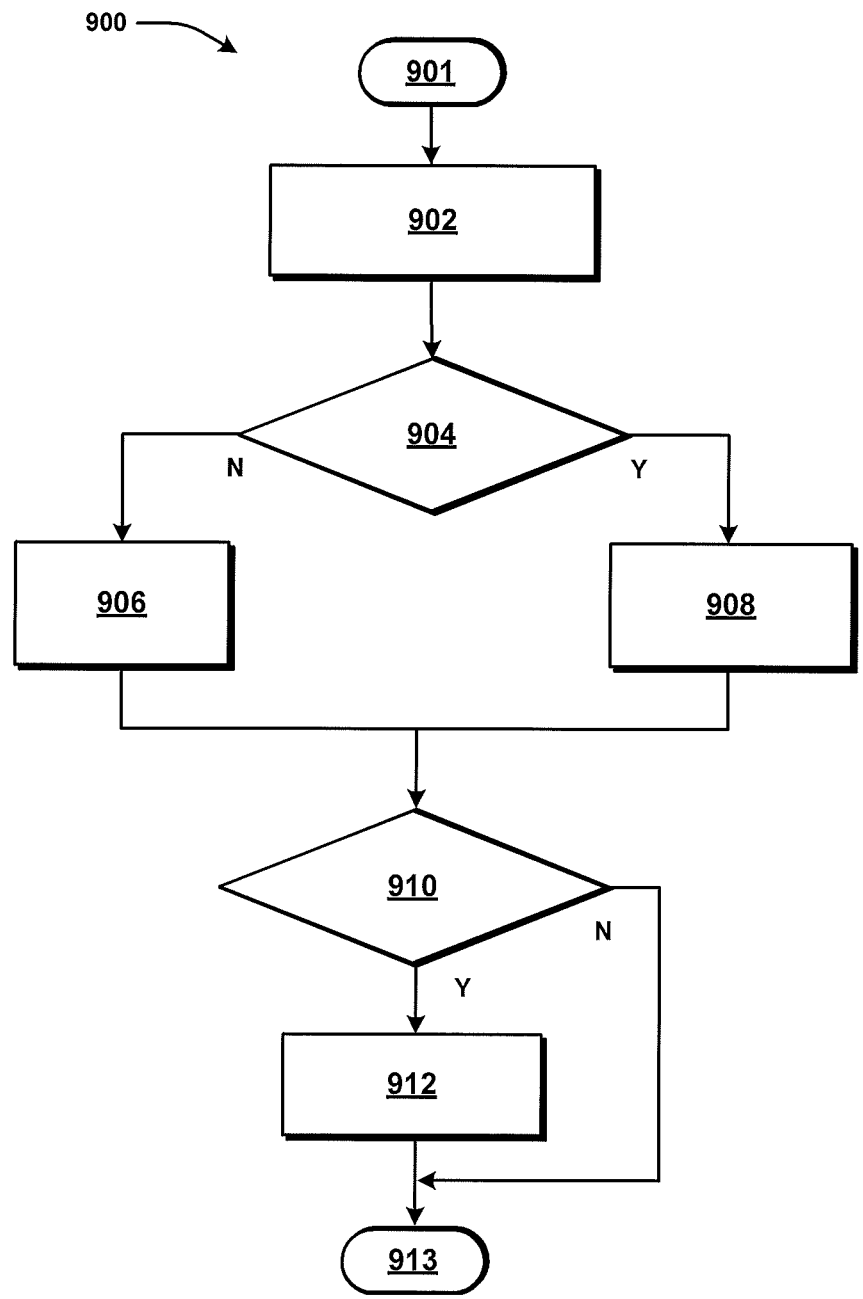
FIG. 9 illustrates a method for computing propagation of vehicle pose, according to an embodiment of the present disclosure.

FIG. 9 shows a method 900 for computing a propagation of vehicle pose, per step 206 of the method 200 illustrated in FIG. 2. The propagation evaluation may be performed, for example, from time index t to t+1. As an aside, in t+1, 1 does not necessarily represent 1 second. Rather, t+1 refers to a time instance after time=t, and can be separated from time=t by any space of time, such as 1 second, 0.5 second, 0.25 second, or 0.10 second, for example.

The steps of the method 900 are not necessarily presented in any particular order and that performance of some or all the steps in an alternative order is possible and is contemplated.

The steps of the method 900 are presented in the demonstrated order for ease of description and illustration. Steps can be added, omitted and/or performed simultaneously without departing from the scope of the appended claims. It should also be understood that the illustrated method 900 can be ended at any time. In certain embodiments, some or all steps of this process, and/or substantially equivalent steps are performed by execution of computer-readable instructions stored or included on a computer-readable medium. For instance, the method may be performed by the processor 106 executing instructions, corresponding to one or more algorithms, stored in the memory 104 of the OBC 100 of the host vehicle 102.

The method 900 begins 901 and at step 902, the following dead-reckoning is used to predict the state variables e, n, □, and v:

$$s(t+1) = f(s(t), u_t)$$

where f denotes a dead-reckoning function using a previous state vector s(t) and a control input $u_t$ (e.g., yaw rate and velocity) from vehicle-dynamics sensors, such as the IMU 120 and wheel sensors 122.

The dead-reckoning function may include constant velocity (CV) and constant turning (CT) vehicle kinematic models. In multi-lane scenarios, a special handling procedure is needed regarding a state variable L. The special handling procedure is outlined below in connection with steps 904-912 of the method 900.

Figure 10C:
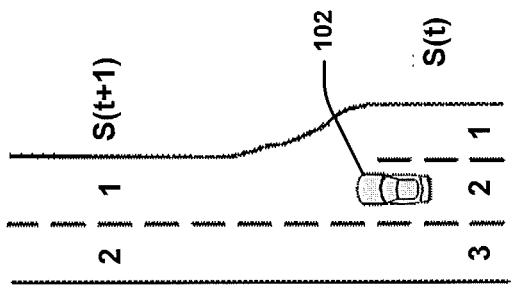
FIGS. 10A, 10B, and 10C illustrate a lane indexing convention, a lane split, and lane merging, respectively, in various on-road scenarios, according to an embodiment of the present disclosure.
Figure 10B:
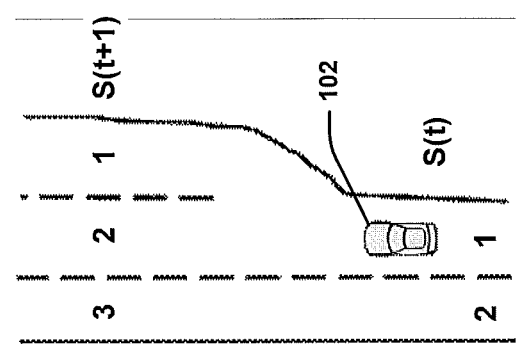
Figure 10A:
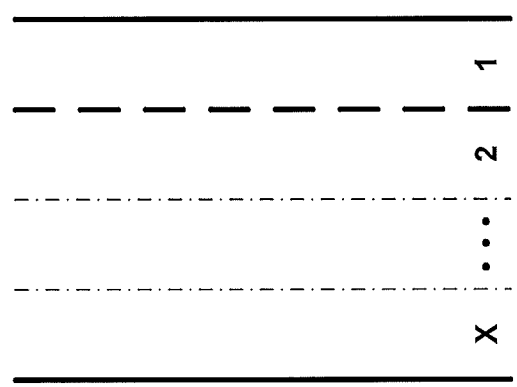

For purpose of illustration with respect to the methods of the present disclosure, FIGS. 10A-10C show various multi-lane scenarios. FIG. 10A shows multiple lanes and references of a lane index, or lane identifying convention. According to the convention, a rightmost lane is considered a first lane, and identified by a lane index L=1, the next lane from the right is the second lane, identified by lane index L=2, and so on. FIG. 10B illustrates a lane-splitting scenario in which a single lane (lane having an index L=1, towards the bottom of FIG. 10B) splits into two lanes (lanes having indices L=1 and 2, towards the top of FIG. 10B). FIG. 10C illustrates a merging scenario in which two lanes (lanes having indices of L=1 and 2 at S(t), towards the bottom of FIG. 10C) merge into a single lane (lane having an index L=1, towards the top of FIG. 10C).

Continuing with FIG. 9, at step 904, it is considered whether a lane-change maneuver is apparently present. If a lane-change maneuver for the host vehicle 102 is not detected at step 904, flow proceeds to step 906 whereby the lane index value L is maintained.

If a lane-change maneuver for the host vehicle 102 is detected at step 904, flow proceeds to step 908, whereat the assigned lane index L is increased by one, in response to a left lane change, or the lane index L is decreased by one in response to a right lane change.

At step 910, it is considered whether there is a lane-split or lanes-merging condition. As provided, FIGS. 10B and 10C show a lane-split and lanes-merging scenarios, respectively. If it is determined at step 910 that either the lane in which the host vehicle 102 is splitting or the host vehicle 102 is involved with a lane merging, flow proceeds to step 912. The host vehicle 102 is involved with a merging if the lane in which the host vehicle 102 is in is merging into an adjacent lane or an adjacent lane is merging into the lane of the host vehicle 102.

At step 912, the lane index L for the vehicle 102 is reassigned appropriately. For example, for the lane splitting scenario of FIG. 10B, the lane index L of the vehicle is changed from 1 to 2 if the vehicle 102 does not change lanes as it moves from its position at time t (corresponding to state S(t)) to its position at time=t+1 (corresponding to S(t+1)).

If the vehicle 102 stays to the right-most lane in FIG. 10B (i.e., changes lanes), it can be seen that the appropriate lane index L will remain 1, as the vehicle 102 will remain in the right-most lane. In this case, the scenario includes a lane split and a change of lanes.

As a lane index L reassignment regarding a lane merging scenario, the lane index L for the host vehicle 102 would be reassigned to 2 from 1 in the merging scenario of FIG. 10C as the vehicle moves from its position at time=t to its position at time=t+1.

In a hypothetical scenario, the vehicle 102 is positioned in a lane that is merging (versus being in a lane into which an adjacent lane is merging—see e.g., FIG. 10C). With reference to FIG. 10C, for instance, if the vehicle 102 in this hypothetical had a lane index L of 1 at time t (i.e., was in the right-most lane at time=t), then the appropriate lane index L would remain at 1 as the vehicle moves from S(t) to S(t+1) due to the merge. This hypothetical scenario can be seen to include both a merge in the road and a lane change for the host vehicle 102. In this case, the lane index L reassignment of step 912 results in the lane index L for the vehicle 102 remaining at 1 (i.e., the right-most lane) due to the lane renumbering resulting from the merger of original lanes 1 and 2 into new lane 1 and the vehicle 102 moving to the new right-most lane 1.

Given the distribution of state s(t) represented by the particle set S(t)={$s_i$, i=1, . . . , N} and a number of lane #, the particle representation S(t+1)={$s'_i$, i=1, . . . , N} of the predicted distribution of state vector s(t+1) can be computed. For each particle, $s_i \in S(t)$, the following three steps are executed:

1. $s_i' = (e_i', n_i', \theta_i', v_i', L_i')$ and $s_i = (e_i, n_i, \theta_i, v_i, L_i)$;

2. State variables $e_i'$, $n_i'$, $\theta_i'$, and $v_i'$ are computed as $s_i' = f(s_i, u_i) + w_i$, where $w_i$ is a number randomly sampled from the process noise distribution that models the uncertainty of the dead-reckoning; and.

3. State variable $L_i'$ is computed separately as:

$$L_i' = \begin{cases} L_i & \text{if no } LC \\ L_i + 1 & \text{if left } LC \\ L_i - 1 & \text{if right } LC \\ \text{randomly draw from set } \{1, \ldots, \#\} & \text{in 0.1 probability} \end{cases} \quad (6)$$

If a lane split or merge occurs, then the value of $L_i'$ is assigned according to the rules described above.

In one embodiment, in the above step 2, a random mechanism is added so that the lane indices of a certain percentile (e.g., about 10 percent) of the particles are reassigned a value randomly drawn from a uniform distribution in set $\{1, \ldots, \#\}$. The method 900 may end 913.

V. Vision-System Enhanced Dead-Reckoning

FIG. 11 schematically illustrates an on-road scenario associated with the process for updating the vision observation model described above in connection with FIGS. 3 and 4. Particularly, FIG. 11 further shows an on-road scenario including an overhead structure 1102, such as a bridge or tunnel. FIG. 11 shows a lane centerline $LC_L$, a vehicle centerline $VC_L$, lateral distances $Y'_R, Y'_L$ from the vehicle centerline $VC_L$ to right and left lane boundaries, respectively, and an angular offset $\phi$ between the lane centerline $LC_L$ and the vehicle centerline $VC_L$.

As described above, the vision system, including for instance the camera 116, can be used to enhance dead-reckoning performance. This improvement is accomplished by tracking lane-change events as described above. Based on the observation models described in FIGS. 3 and 4, a particle filter is used to update weights of the particles according to the observation distribution, and then the steps of performing an importance re-sampling, computing a mean of the particles, and outputting the mean as the estimated vehicle position.

VI. Improved Positioning Using Landmarks

FIG. 12 schematically illustrates an on-road scenario comprising landmarks, including a first curve 1202 (Curve A) and an overhead structure 1204, such as a bridge or tunnel. The vehicle 102 can evaluate characteristics of the landmarks to improve vehicle 102 positioning as described further below, and above in connection with steps 708-712 of the method 700 of FIG. 7. Though an overhead structure and curve are described, other landmarks may be used without departing from the scope of the present disclosure.

As described regarding the method 700 of FIG. 7, known SPS positions of landmarks can be used in positioning the vehicle 102. Particularly, characteristics of landmarks, such as a start or end of a curve or bridge in the map database are compared to measurements made by the vehicle 102 regarding the same characteristics for improving vehicle 102 positioning.

The vehicle 102 can determine when it is first entering a curve, and then when it is exiting the curve 1202, by, for example, output of a yaw-rate sensor, such as the IMU 120. The yaw information is in some embodiments supplemented with vision data, such as data indicating locations and/or orientations of a road and/or lane edge with respect to position and pose of the vehicle 102. The vehicle 102 can determine that it is under or very close to an overhead structure by determining that SPS, or other, signals are not being received. It is also contemplated that the vehicle 102 can sense aspects of the structure (e.g., by radar and/or camera), such as supporting columns or sidewalls of a bridge or entrance features of a tunnel, for determining that the structure is overhead or very near.

The vehicle 102 corrects or adjusts its SPS position (e.g., longitudinal) and/or pose based on the characteristics of the landmarks sensed by the vehicle 102. The position correction performed with respect to overhead structures, relying heavily on vision capabilities, is especially helpful when SPS signals are blocked.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method, performed by a vehicle having an on-board computer, vehicle sensors, a satellite-positioning unit, a database storing a lane-level map for determining a new pose of the vehicle using map matching, comprising:
    collecting, by the on-board computer of the vehicle, measurements from the vehicle sensors;
    computing, by the on-board computer of the vehicle, propagation of vehicle pose with respect to consecutive time instances;
    performing, by the on-board computer of the vehicle, a curve-fitting process;
    performing, by the on-board computer of the vehicle, a sub-routine of updating at least one observation model based on results of the curve-fitting process;
    performing, by the on-board computer of the vehicle, a tracking sub-routine to update the vehicle pose in terms of data particles; and
    performing, by the on-board computer of the vehicle, a particle-filtering sub-routine based on the data particles to compute the new vehicle pose, the particle-filtering sub-routine employing a sampling technique for identifying, from amongst the data particles being of a first distribution, more-applicable data particles and less-relevant particles.

2. The method of claim 1, wherein the curve-fitting process comprises:
    obtaining global-positioning coordinates indicating a position of the vehicle;
    identifying the location of the vehicle within the lane-level map;
    defining a current segment of a present road for the vehicle, wherein the road segment is represented by waypoints identifying aspects of the road;
    computing a curvature profile of a cubic curve fitted from the waypoints; and
    identifying a closest point on the curve from the vehicle.

3. The method of claim 1, wherein the sampling technique comprises:
   sampling, using data points associated with a different distribution, the data particles of the first distribution to identify the applicable particles and in so doing identify the less-relevant particles; and
   computing the new vehicle pose as a mean of the applicable particles identified, wherein the less-relevant particles are considered less than the applicable particles or not at all.

4. The method of claim 1, wherein the sub-routine of updating at least one observation model based on results of the curve-fitting process comprises:
   generating vision observation model;
   generating a radar observation model;
   generating a global-positioning observation model;
   generating a map-attribute-matching observation model;
   updating the vision observation model subsequent to generating the vision observation model;
   updating the radar observation model subsequent to generating the radar observation model;
   updating the global-positioning observation model subsequent to generating the global-positioning observation model; and
   updating the map-attribute-matching observation model subsequent to generating the map-attribute observation model.

5. The method of claim 4, wherein the sub-routine of updating the vision model comprises:
   retrieving data from the lane-level map identifying at least one registered lane line near the vehicle;
   computing a position of the lane line with respect to a reference frame of the host vehicle;
   matching the detected and registered lane stripes and boundaries using a distance analysis, yielding matched data; and
   computing an observation probability distribution with respect to vision data, from a camera of the vehicle sensors, using the matched data.

6. The method of claim 5, wherein:
   retrieving data from the lane-level map identifying registered lane stripes near the vehicle is performed using the propagation computed;
   the identified lane stripes are those determined to be within a predetermined threshold distance of a position of the vehicle;
   computing the position of the lane line with respect to the reference frame of the host vehicle comprises projecting the lane stripes procured from a coordinate system of the lane-level map onto the reference frame of the vehicle; and
   matching the detected and registered lane stripes and boundaries comprises using a Euclidean-type analysis of distance as the distance analysis.

7. The method of claim 4, wherein the sub-routine of updating the radar model comprises:
   reading radar data from a range sensor of the vehicle sensors;
   deleting static radar objects from data objects of the radar data;
   determining whether there is a present lane-change maneuver for the vehicle;
   assigning, if it is determined that there is not the present lane-change maneuver, a lane to each detected moving radar object based on a lateral offset from a centerline of a lane of the host vehicle; and
   computing, if it is determined that there is the present lane-change maneuver, a vision observation model with respect to the radar data.

8. The method of claim 7, wherein determining whether there is the present lane-change maneuver for the vehicle comprises at least one act selected from a group consisting of:
   evaluating an angular offset between a centerline of the vehicle and a lane centerline; and
   evaluating a lateral offset between the vehicle and one or more lane boundaries and/or the lane centerline.

9. The method of claim 4, wherein the sub-routine of updating the map-attribute-matching observation model comprises:
   determining yaw rate and speed from data of the vehicle sensors;
   determining whether an overhead structure is present;
   if the overhead structure is determined present:
      determining a position of the overhead structure based on data, of the lane-level map, identifying the structure;
      detecting the overhead structure using global-positioning data; and
      computing an observation probability distribution associated with the map with respect to the overhead object;
   determining whether a lane-change maneuver is present;
   if it is determined that the lane-change maneuver is present:
      computing a lane curvature;
      computing a vehicle-path curvature; and
      computing an observation probability distribution for curvature match based on the computed vehicle-path curvature; and
   computing a combined probably distribution with respect to the lane-level map, including considering the probability distributions computed.

10. The method of claim 9, wherein:
    computing the lane curvature comprises computing the lane curvature as a function of an arc length of the curve;
    the arc length is discerned using global-positioning data identifying waypoints on the curve; and
    computing the vehicle-path curvature is performed using the lane curvature.

11. The method of claim 1, wherein computing propagation of vehicle pose with respect to consecutive time instances comprises:
    predicting state variables for the vehicle according to a dead-reckoning function;
    considering whether a lane-change maneuver is present;
    maintaining, if the lane-change maneuver is not present, a previously-assigned lane-index value;
    increasing the previously-assigned lane-index value by one in response to a left lane change or decreasing the previously-assigned lane-index value by one in response to a right lane change;
    considering whether there is a lane-split or lanes-merging condition; and
    reassigning, if it is determined that either the lane-split or lanes-merging condition is present, the lane-index value for the vehicle based on information about the lane-split or lanes-merging condition.

12. The method of claim 11, wherein predicting the state variables comprises predicting as the state variables e, n, $\Theta$, and v:

$$s(t+1)=f(s(t),u_t)$$

where f denotes the dead-reckoning function using a previous state vector s(t) and a control input $u_t$ (e.g., yaw rate and velocity) from sensors of the vehicle sensors.

13. The method of claim 11, wherein the dead-reckoning function comprises a constant velocity (CV) vehicle kinematic model and a constant turning (CT) vehicle kinematic model.

14. A transportation vehicle configured to determine a new pose of the vehicle using map matching, the vehicle comprising:
multiple vehicle sensors;
a satellite-positioning unit; and
an on-board computer comprising:
a processor; and
a memory comprising:
a lane-level map; and
computer-executable instructions that, when executed by the processor, cause the processor to perform operations comprising:
collecting measurements from the vehicle sensors;
computing compute propagation of vehicle pose with respect to consecutive time instances;
performing a curve-fitting process;
performing a sub-routine of updating at least one observation model based on results of the curve-fitting process;
performing a tracking sub-routine to update the vehicle pose in terms of data particles; and
performing a particle filtering sub-routine based on the data particles to compute the new vehicle pose, the particle-filtering sub-routine employing a sampling technique for identifying, from amongst the data particles being of a first distribution, more-applicable data particles and less-relevant particles.

15. The vehicle of claim 14, wherein the sub-routine of updating at least one observation model based on results of the curve-fitting process comprises:
generating vision observation model;
generating a radar observation model;
generating a global-positioning observation model;
generating a map-attribute-matching observation model;
updating the vision observation model subsequent to generating the vision observation model;
updating the radar observation model subsequent to generating the radar observation model;
updating, the global-positioning observation model subsequent to generating the global-positioning observation model; and
updating, the map-attribute-matching observation model subsequent to generating the map-attribute observation model.

16. The vehicle of claim 15, wherein the sub-routine of updating the radar model includes comprises:
reading radar data from a range sensor of the vehicle sensors;
deleting static radar objects from data objects of the radar data;
determining whether there is a present lane-change maneuver for the vehicle;
assigning, if it is determined that there is not the present lane-change maneuver, a lane to each detected moving radar object based on a lateral offset from a centerline of a lane of the host vehicle; and
computing, if it is determined that there is the present lane-change maneuver, a vision observation model with respect to the radar data.

17. The vehicle of claim 15, wherein the sub-routine of updating the map-attribute-matching observation model comprises:
determining yaw rate and speed from data of the vehicle sensors;
determining whether an overhead structure is present;
if the overhead structure is determined present:
determining a position of the overhead structure based on data, of the lane-level map, identifying the structure;
detecting the overhead structure using global-positioning data; and
computing an observation probability distribution associated with the map with respect to the overhead object;
determining whether a lane-change maneuver is present;
if it is determined that the lane-change maneuver is present:
computing a lane curvature;
computing a vehicle-path curvature; and
computing an observation probability distribution for curvature match based on the computed vehicle-path curvature; and
computing a combined probably distribution with respect to the lane-level map, including considering the probability distributions computed.

18. The vehicle of claim 14, wherein computing propagation of vehicle pose with respect to consecutive time instances comprises:
predicting state variables for the vehicle according to a dead-reckoning function;
considering whether a lane-change maneuver is present;
maintaining, if the lane-change maneuver is not present, a previously-assigned lane-index value;
increasing the previously-assigned lane-index value by one in response to a left lane change or decreasing the previously-assigned lane-index value by one in response to a right lane change;
considering whether there is a lane-split or lanes-merging condition; and
reassigning, if it is determined that either the lane-split or lanes-merging condition is present, the lane-index value for the vehicle based on information about the lane-split or lanes-merging condition.

19. A tangible computer-readable storage device, for use in a transportation vehicle, comprising computer-executable instructions that, when executed by a processor, cause the processor to perform operations comprising:
collecting measurements from the vehicle sensors;
computing propagation of vehicle pose with respect to consecutive time instances;
performing a curve-fitting process;
performing a sub-routine of updating at least one observation model based on results of the curve-fitting process;
performing, a tracking sub-routine to update the vehicle pose in terms of data particles; and
performing, a particle-filtering sub-routine based on the data particles to compute the new vehicle pose, the particle-filtering sub-routine employing a sampling technique for identifying, from amongst the data particles being of a first distribution, more-applicable data particles and less-relevant particles.

20. The tangible computer-readable storage device of claim 19, wherein the sub-routine of updating at least one observation model based on results of the curve-fitting process comprises:
generating vision observation model;
generating a radar observation model;

generating a global-positioning observation model;
generating a map-attribute-matching observation model;
updating the vision observation model subsequent to generating the vision observation model;
updating, the radar observation model subsequent to generating the radar observation model;
updating, the global-positioning an SPS observation model subsequent to generating the global-positioning observation model; and
updating the map-attribute-matching observation model subsequent to generating the map-attribute observation model.

* * * * *